Dec. 4, 1934.  H. M. MARSH  1,982,961
WATER SOFTENING APPARATUS
Filed Dec. 18, 1933
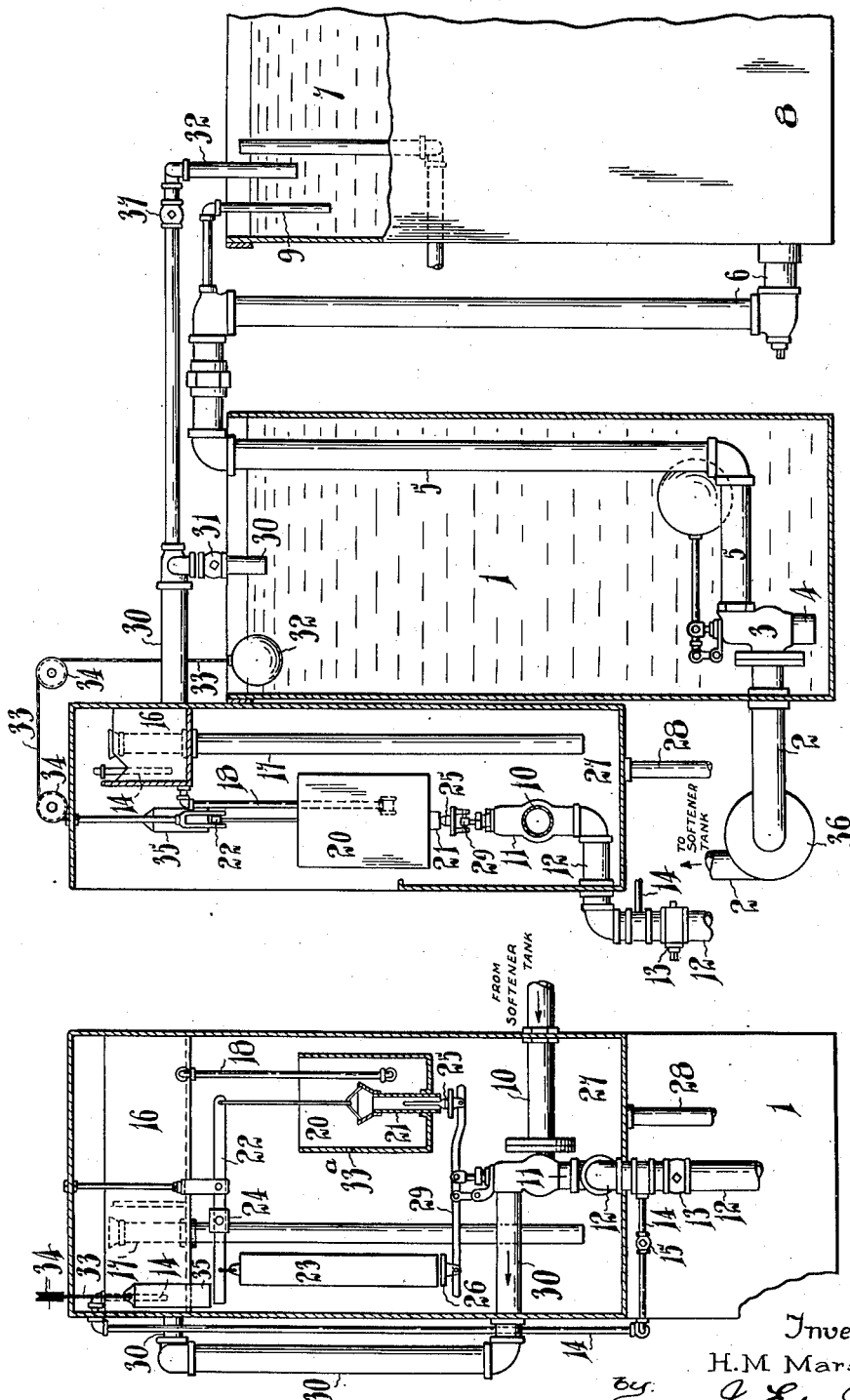

Patented Dec. 4, 1934

1,982,961

UNITED STATES PATENT OFFICE 1,982,961

WATER SOFTENING APPARATUS

Harry M. Marsh, Hamilton, Ontario, Canada

Application December 18, 1933, Serial No. 702,859

14 Claims. (Cl. 210—24)

This invention relates to water softening apparatus of the type in which the water to be purified is caused to flow through a bed of zeolite which, thereafter, requires to be regenerated by flowing through it a regenerating medium such as a solution of sodium chloride, commonly referred to as brine.

Ordinarily fresh brine solution is allowed to flow to the bed of zeolite and thence to waste till the zeolite is entirely regenerated and prior to which time there is still a usable sodium chloride content in the latter part of the flow of solution. While a partly spent portion of the brine solution may be manually diverted to a storage tank for re-use, this involves the attention of an attendant, who has no means of determining what proportion of the regenerating medium should be retained.

My object in the present invention therefore is to devise automatic means for reclaiming a part of the regenerating medium to be first used in the regenerating process and for thereafter supplying a predetermined quantity of fresh brine to complete the regenerating process, a part of which fresh brine will be reclaimed to start a new cycle of regeneration.

I attain my object and others which will hereinafter appear, by means of constructions which may be briefly described as follows: Means are provided for leading part of the brine solution flowing from the zeolite bed to valve actuating apparatus responsive to changes in the specific gravity of the solution, whereby initially the solution flows to waste, but as soon as its specific gravity rises to a predetermined point the flow is directed to a storage tank for reclaimed brine, from which any surplus flows to a dissolving tank in which fresh brine is prepared.

Means are also provided for automatically supplying a predetermined quantity of fresh brine after a tank of reclaimed brine has been used in the reclamation process.

The whole is constructed in detail substantially as hereinafter described and illustrated in the accompanying drawing in which Fig. 1 is a longitudinal vertical section of the apparatus; and Fig. 2 an end elevation, partly in section.

In the drawing like numerals of reference indicate corresponding parts in the different figures.

Referring to the drawing, 7 is a salt dissolving tank into which at its upper end discharges the pipe 32 connected with the pipe 30 leading to the upper end of the reclaimed brine tank 1. A valve 31 controls the proportion of flow which will pass to the tank 1 and a valve 37 controls the proportion of flow in the pipe 30 which will pass through the pipe 32 to the tank 7.

With the lower end of the tank 7 a pipe 6 is connected which extends up above the top of the tank 7 and is connected with the depending pipe 5 to form a siphon.

The pipe 5 communicates with a three-way float valve 3 located at the bottom of the tank 1. This valve has an inlet 4 opening into the bottom of the tank 1 and an outlet pipe 2 which extends to the top of the softener tank (not shown). In the pipe 2 will be connected some means of circulating the brine which has been diagrammatically illustrated as a pump 36. A pipe 9 extends from the top of the siphon formed by the pipes 5 and 6 and depends in the tank 7.

The operation of the apparatus as so far described is as follows. If the pump 36 is in action the brine solution in the tank 1 will be drawn out until the float valve 3 closes the inlet 4 and opens a communication between the pipes 5 and 2. Thereafter brine is drawn from the tank 7 until air can enter the lower end of the pipe 9 when the siphon is broken and no more brine can be withdrawn from the tank 7 till the liquid level therein is again raised. The regenerating medium passes from the softener tank through the pipe 10 to apparatus for determining how much of the medium shall go to waste and how much shall be reclaimed. The pipe 10 connects with the pipe 30 leading to the reclaimed brine tank 1.

At the junction of the pipes 10 and 30 is positioned a three-way valve 11 which communicates also with the waste pipe 12. This valve is controlled by the suitably fulcrumed lever 29, of the first order, to put the pipe 10 in communication with either the pipe 30 or the pipe 12.

The lever 29 is actuated by the following mechanism: A scale beam 22 is fulcrumed intermediate of its ends and to one end of it is hung the bucket 20. From the other end of the beam is hung the counterweight 23. A weight 24 adjustable on the beam provides means for accurate adjustment of the balance. An overflow pipe 21 extends up through the bottom of the bucket to a level such that, when the bucket is full to the level of the top of the overflow with fresh water, the bucket and weight 23 will balance one another. The lower end of the weight 23 normally rests on the plate 26 secured to the lever 29.

A valve plug 25 is secured to the other end of the lever 29 and is adapted to close, or nearly close, the lower end of the pipe 21 when a movement of approach occurs between them.

The bucket is supplied with a suitable proportion of the water or brine solution flowing from the softener tank through the pipe 10 by means of the by-pass pipe 14 which is connected to the pipe 12 below the valve 11.

A valve 13 in the drain pipe 12 controls the rate of flow from the softener tank and a valve 15 in the pipe 14 controls the proportion of flow through the by-pass during the time water is discharging through the pipe 12 to waste.

The pipe 14 discharges into an overhead tank 16 provided with an overflow pipe 17 whose function is to maintain a constant head in the tank and thus a constant rate of filling of the bucket. From the bottom of the tank 16 leads a discharge pipe 18 which extends into the bucket. The overflow 17 and the overflow 21 both discharge into the chamber 27 from which leads the waste pipe 28.

From the above construction it follows that, while regenerating medium is flowing to waste a proportion flows to the bucket and fills it to the top of the overflow pipe. Fresh water comes first from the softener tank, and its weight is not sufficient to overbalance the weight 23 but, as the more or less spent brine comes over, the specific gravity of the contents of the bucket gradually changes till a point is arrived at when the weight of the bucket and contents is sufficient to overcome the counterbalancing weight and the bucket commences to move towards its outlet closing position.

As the bucket descends it moves towards the plug 25, which closes the lower end of the outlet pipe 21. The bucket then fills rapidly and its weight becomes sufficient to rapidly actuate the lever 29 to cause the valve 11 to close the waste pipe 12 and direct the flow of reclaiming medium through the pipe 30 to the tanks 1 and 7.

A small bleed hole 33$^a$ is formed in the wall of the bucket at or just above the level of the top of the overflow pipe 21.

When the flow is stopped through pipes 12 and 14 by diversion of the flow of reclaimed medium through the pipe 30 to the tanks 1 and 7 no supply is delivered to the overhead tank 16 and, consequently, none to the bucket 20, so that this bucket 20 empties through the bleed hole 33$^a$ to waste until the water level in the bucket is at the bleed hole.

To prevent overfilling of the reclaimed brine tank 1, I position therein a float 32 connected with a weight 35 by a cable 33 running over sheaves 34. This weight is positioned over the end of the scale beam 22 adjacent the weight 23.

The bleed hole, when the float controlled weight is employed, is made fairly large and is preferably positioned about 1" above the top of the overflow tube 21. The result of this is that the medium in the bucket will empty out quickly to this level before the reclaimed brine tank is quite full and the weight 35 is caused to operate on the scale beam 22 to overcome the weight of this extra inch of liquid as the tank float 32 lifts. The bucket is then quickly lifted to unseat the lower end of the overflow tube 21 from the plug 26 and drain the bucket.

The general operation is as follows. Assuming that the zeolite bed in the softener tank is fresh or regenerated, water to be softened is passed through the tank as long as the zeolite bed retains its efficiency. When regeneration is to be effected the flow of hard water is stopped and reclaimed brine from the tank 1 is fed to the top of the softener tank through the pipe 2 by the pump 36 or other circulating means.

As soon as the reclaimed brine tank is emptied a predetermined amount of fresh brine is drawn from the bottom of the tank 7 as hereinbefore described and passed through the zeolite bed.

The more or less spent brine passing from the softener tank flows to waste until its specific gravity is sufficient to cause the overbalancing of the bucket and the diversion of the flow from waste to pass back to the tanks 1 and 7. After the last of the brine has been reclaimed and a flow of soft water established the pipe 10 from the softener tank is closed and the latter takes up again the water softening phase of the cycle of operations.

From the above description it will be seen that I have devised apparatus which will satisfactorily attain the object of my invention as set out in the preamble to this specification.

What I claim as my invention is:

1. In water softening apparatus the combination of a reclaimed brine tank; an outlet therefrom for connection with the inlet of a softener tank; a pipe for connection with the outlet of a softener tank; conducting means to which said pipe leads communicating with the reclaimed brine tank and having a waste outlet; and means responsive to changes in the specific gravity of liquid flowing from the softener tank for controlling the flow of liquid to the reclaimed brine tank or to waste.

2. In water softening apparatus the combination of a reclaimed brine tank; an outlet therefrom for connection with the inlet of a softener tank; a pipe for connection with the outlet of a softener tank; conducting means to which said pipe leads communicating with the reclaimed brine tank and having a waste outlet; a counterbalanced bucket; means for leading part of the waste water from the softener tank to the bucket; and means whereby the movements of the bucket due to changes in the specific gravity of the liquid discharged thereto control the flow of liquid to the reclaimed brine tank or to waste.

3. In water softening apparatus the combination of a reclaimed brine tank; an outlet therefrom for connection with the inlet of a softener tank; a pipe for connection with the outlet of a softener tank; conducting means to which said pipe leads communicating with the reclaimed brine tank and having a waste outlet; a by-pass pipe leading from the pipe aforesaid; a counterbalanced bucket to which the flow from said by-pass is discharged; and means whereby the movements of the bucket due to changes in the specific gravity of the liquid discharged thereto control the flow of liquid to the reclaimed brine tank or to waste.

4. In water softening apparatus the combination of a reclaimed brine tank; an outlet therefrom for connection with the inlet of a softener tank; a pipe for connection with the outlet of the softener tank; conducting means to which said pipe leads communicating with the reclaimed brine tank and having a waste outlet; a counterbalanced bucket adapted to close the waste outlet; means for leading part of the waste water from the softener tank to the bucket; an overflow pipe leading down from the bucket from a lower level than its top; means for choking said overflow by the downward movement of the bucket without interfering with its further movement to its waste outlet closing position; and a bleed for draining the bucket to the level of the overflow.

5. In water softening apparatus the combination of a reclaimed brine tank; an outlet therefrom for connection with the inlet of a softener tank; a pipe for connection with the outlet of the softener tank; conducting means to which said pipe leads communicating with the reclaimed brine tank and having a waste outlet; a valve in said means adapted to direct flow to the reclaimed brine tank or to waste; and a counterbalanced bucket adapted by its rise to actuate said valve to direct the flow to the tank and by its fall to the waste outlet, the said counterbalance being adapted to counterbalance the bucket when the latter is full to its normal water level with ordinary water.

6. In water softening apparatus the combination of a reclaimed brine tank; an outlet therefrom for connection with the inlet of a softener tank; a pipe for connection with the outlet of the softener tank; conducting means to which said pipe leads communicating with the reclaimed brine tank and having a waste outlet; a valve in said means adapted to direct flow to the reclaimed brine tank or to waste; a counterbalanced bucket adapted by its rise to actuate said valve to direct the flow to the tank and by its fall to the waste outlet, the said counterbalance being adapted to counterbalance the bucket when the latter is full to its normal water level with ordinary water; and means for increasing the loading of the bucket after its downward movement has been started due to increase in the specific gravity of the liquid discharged thereto.

7. In water softening apparatus the combination of a reclaimed brine tank; an outlet therefrom for connection with the inlet of a softener tank; a pipe for connection with the outlet of the softener tank conducting means to which said pipe leads communicating with the reclaimed brine tank and having a waste outlet; a valve in said means adapted to direct flow to the reclaimed brine tank or to waste; a counterbalanced bucket adapted by its rise to actuate said valve to direct the flow to the tank and by its fall to the waste outlet, the said counterbalance being adapted to counterbalance the bucket when the latter is full to its normal water level with ordinary water; means for increasing the loading of the bucket after its downward movement has been started due to increase in the specific gravity of the liquid discharged thereto; and means for decreasing the loading of the bucket to normal when the supply of liquid to the bucket ceases.

8. In water softening apparatus the combination of a salt dissolving tank and a reclaimed brine tank connected adjacent their upper ends; a siphon having one leg communicating at its lower end with the lower end of the salt dissolving tank and the lower end of its other leg positioned in the reclaimed brine tank; an outlet pipe for brine; a three-way float valve adapted, when lifted, to form a communication between the reclaimed brine tank and the outlet pipe and, when lowered, a communication between the siphon and the outlet pipe; and a pipe connected with the top of the siphon and depending in the salt dissolving tank adapted to break the siphon when a predetermined amount of brine has been withdrawn from the tank.

9. In water softening apparatus the combination of a reclaimed brine tank; an outlet therefrom for connection with the inlet of a softener tank; a pipe for connection with the outlet of a softener tank; conducting means to which said pipe leads communicating with the reclaimed brine tank and having a waste outlet; means responsive to changes in the specific gravity of liquid flowing from the softener tank for controlling the flow of liquid to the reclaimed brine tank or to waste; and a salt dissolving tank communicating with the reclaimed brine tank.

10. In water softening apparatus the combination of a reclaimed brine tank; an outlet therefrom for connection with the inlet of a softener tank; a pipe for connection with the outlet of the softener tank, conducting means to which said pipe leads communicating with the reclaimed brine tank and having a waste outlet; a counterbalanced bucket adapted to close the waste outlet; means for leading part of the waste water from the softener tank to the bucket; an overflow pipe leading down from the bucket from a lower level than its top; means for choking said overflow by the downward movement of the bucket without interfering with its further movement to its waste outlet closing position; a bleed for draining the bucket to the level of the overflow; a float in the reclaimed brine tank; and a weight connected to the float to fall as the latter rises and by its downward movement tend to lift the bucket.

11. In water softening apparatus the combination of a reclaimed brine tank; means for feeding brine therefrom to a softener tank; a pipe for receiving waste reclaiming solution from the softener tank; conducting means to which said pipe leads communicating with the reclaimed brine tank and having a waste outlet; a counterbalanced bucket; means for leading part of the waste from the softener tank to the bucket; means whereby the movements of the bucket due to changes in the specific gravity of the liquid discharged thereto control the flow of liquid to the reclaimed brine tank or to waste; a salt dissolving tank communicating with the reclaimed brine tank; and means controlled by the fall of the water level in the reclaimed brine tank for withdrawing a predetermined amount of brine from the salt dissolving tank following the withdrawal of a predetermined amount from the reclaimed brine tank.

12. In water softening apparatus the combination of a reclaimed brine tank; means for feeding brine therefrom to a softener tank; a pipe for receiving waste reclaiming solution from the softener tank; conducting means to which said pipe leads communicating with the reclaimed brine tank and having a waste outlet; a counterbalanced bucket; means for leading part of the waste from the softener tank to the bucket; means whereby the movements of the bucket due to changes in the specific gravity of the liquid discharged thereto control the flow of liquid to the reclaimed brine tank or to waste; a salt dissolving tank communicating with the reclaimed brine tank; a siphon having one leg communicating at its lower end with the lower end of the salt dissolving tank and the lower end of its other leg positioned in the reclaimed brine tank; an outlet pipe for brine; a three-way float valve adapted, when lifted, to form a communication between the reclaimed brine tank and the outlet pipe and, when lowered, a communication between the siphon and the outlet pipe; and a pipe connected with the top of the siphon and depending in the salt dissolving tank adapted to break the siphon when a predetermined amount of brine has been withdrawn from the tank.

13. In water softening apparatus the combination of a reclaimed brine tank; an outlet therefrom for connection with the inlet of a softener tank; a pipe for connection with the outlet of a softener tank; conducting means to which said pipe leads communicating with the reclaimed brine tank and having a waste outlet; a counterbalanced bucket interpolated in the conducting means; and means whereby the movements of the bucket due to changes in the specific gravity of the liquid discharged thereto control the flow of liquid to the reclaimed brine tank or to waste.

14. In water softening apparatus brine reclaiming means adapted to be interpolated between a softener tank and a reclaimed brine tank comprising conducting means communicating with the softener tank and the reclaimed brine tank and having a waste outlet; and means responsive to changes in the specific gravity of liquid flowing from the softener tank for controlling the flow of liquid to the reclaimed brine tank or to waste.

HARRY M. MARSH.